Feb. 7, 1950     H. J. McCONNELL     2,497,005

PIE PLATE LIFTER

Filed Nov. 22, 1946

INVENTOR
HILLIARD JOSEPH McCONNELL

Ernest E Carver
ATTORNEY

Patented Feb. 7, 1950

2,497,005

UNITED STATES PATENT OFFICE 2,497,005

PIE PLATE LIFTER

Hilliard Joseph McConnell, Vancouver, British Columbia, Canada

Application November 22, 1946, Serial No. 711,617

1 Claim. (Cl. 294—33)

My invention relates to improvements in pie plate lifters.

The removal of hot pies from an oven is the cause of many serious burns to the housewife or cook, and it is with the object of preventing this injury that the present invention is designed. Another object of the invention is to provide means whereby overboiling fruit juices, sometimes present when cooking, shall be prevented from dropping from the rim of the pie plate onto the floor or oven door during the removal of said pie plate and pie from the oven.

The invention contemplates a pie plate lifter having side engaging members adapted to extend more than 180 degrees around the periphery of the pie plates of conventional or standard diameter and a bottom wall adapted to extend beyond one half of the diameter of said pie plate.

Referring to the drawings.

In the drawings like characters of reference indicate corresponding parts in each figure.

Figure 1:
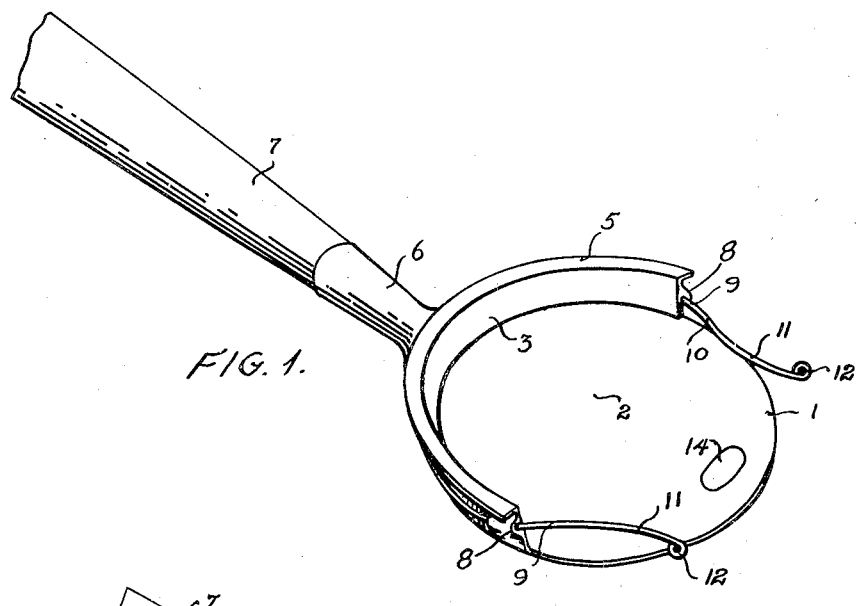
Figure 1 is a perspective view of the invention.

The numeral 1 indicates a pan having a substantially circular bottom wall 2 and a side wall 3, which side wall extends substantially 180 degrees around the periphery of the pan. The side wall is provided with an upper flange 5 which serves to stiffen the pan 1 and enable light gauge material to be used. Extending rearwardly and in an inclined direction from a mid position of the wall 3 is a socket 6 into which a wooden handle 7 is fitted. Each forward end of the side wall 3 is provided with an apertured lug 8.

Figure 2:
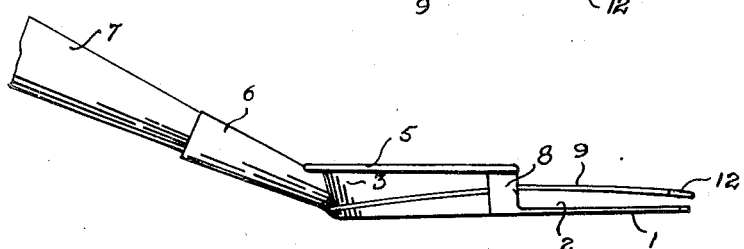
Figure 2 is a side elevational view.

Extending from the handle socket 6 and through the apertured lugs 8 are spring wires 9 which are inwardly curved beyond the lugs 8 as at 10 and about the periphery of the bottom wall so as to embrace the side walls of a pie plate supported upon the pan and prevent accidental slippage of said pie plate in a forward direction. The outer half of each of these wires 9 is outwardly curved as at 11 and extends to a transverse line at or slightly forward of the front edge of the bottom wall. The free ends of each of said wires 9 is bent in the form of an eye 12. The wires 9 are preferably downwardly inclined towards the level of the bottom wall, as shown in Figure 2.

The bottom wall 2 is preferably provided with an opening 14 to facilitate the hanging of the device from a nail or hook.

In use, in inserting a pie into an oven, the pie is placed upon the device and pushed along the oven floor to the desired position, the handle 7 is raised slightly to allow the pie plate to slide from the bottom wall 2. To remove a pie, the device is thrust towards the pie plate, keeping the pan 1 level with the oven floor, the projecting wires 9 being downwardly inclined, slip under the rim of the pie plate and the bottom wall 2 will slide under the bottom of the pie plate. When the pie plate is properly located on the bottom wall 2, the wires will embrace said pie plate and hold it against accidental slipping forwardly therefrom, assuming of course that the device is held substantially level, and tilted in a reverse direction, or with its forward end raised. If the fruit or filling of a pie has boiled over during cooking, and the pie plate is consequently sticking to the oven floor, the front edge of the bottom wall 2 will break the adhesion in picking up the pie and its plate and will enable said plate to be carried from the oven while preventing any hot drops of pie filling from falling onto the open oven door, the kitchen linoleum or furniture.

What I claim as my invention is:

A pie plate lifter comprising a substantially circular pan having a bottom wall, a side wall extending substantially half-way around the periphery of the bottom wall, a pair of apertured lugs at the free ends of the side wall, a radially projecting handle connected intermediate the length of the side wall, a pair of wires extending from the handle through the apertured lugs and from the free ends of the side wall, the inner portion of said wires beyond the lugs being inwardly curved to embrace a pie plate carried by the pan, and the free ends of said wires being outwardly curved to engage a pie plate and guide it into position upon said bottom wall.

HILLIARD JOSEPH McCONNELL.

REFERENCES CITED

The following references are of record in the file of this patent:

UNITED STATES PATENTS

| Number | Name | Date |
|---|---|---|
| 182,343 | Barbour | Sept. 19, 1876 |
| 1,777,284 | Adams | Oct. 7, 1930 |